INVENTOR.
Edmund S. Pomykala

2,740,663
Patented Apr. 3, 1956

2,740,663

METHOD AND APPARATUS FOR MAKING ARTIFICIAL RAIN

Edmund S. Pomykala, Mobile, Ala.

Application December 24, 1951, Serial No. 263,055

5 Claims. (Cl. 299—28)

This invention relates to method and apparatus for making artificial rain. It includes making rain along barren sea shores. Some of such regions, though blessed with magnificent climate, are woefully deficient in rainfall. Water for the larger cities in such regions usually has to be brought hundreds of miles, entailing heavy upkeep and expense. Due to large demands of agriculture the ground water level may be dropping every year. And unless new sources of water are developed, such region will revert to a desert.

To alleviate these conditions and attendant troubles, it is proposed to bring in moisture of the air lying over the open sea and make it available in the form of precipitation to barren adjacent shores.

A further object of this invention is to concentrate the humidity of the air covering the open sea, cool it, and so make it more easily available as rain.

In order to concentrate this humid air, bring on rain, and direct great masses of humid air with the accompanying precipitation in the direction of adjacent arid shores, it is proposed to generate small artificial cyclonic storms, and one of the immediate and important objects of this invention is a method and apparatus for producing such miniature cyclonic storms.

The apparatus and method for generating such a storm is shown in the accompanying drawings, wherein.

In all views similar numerals or numerals and letters refer to similar parts.

Figure 1:
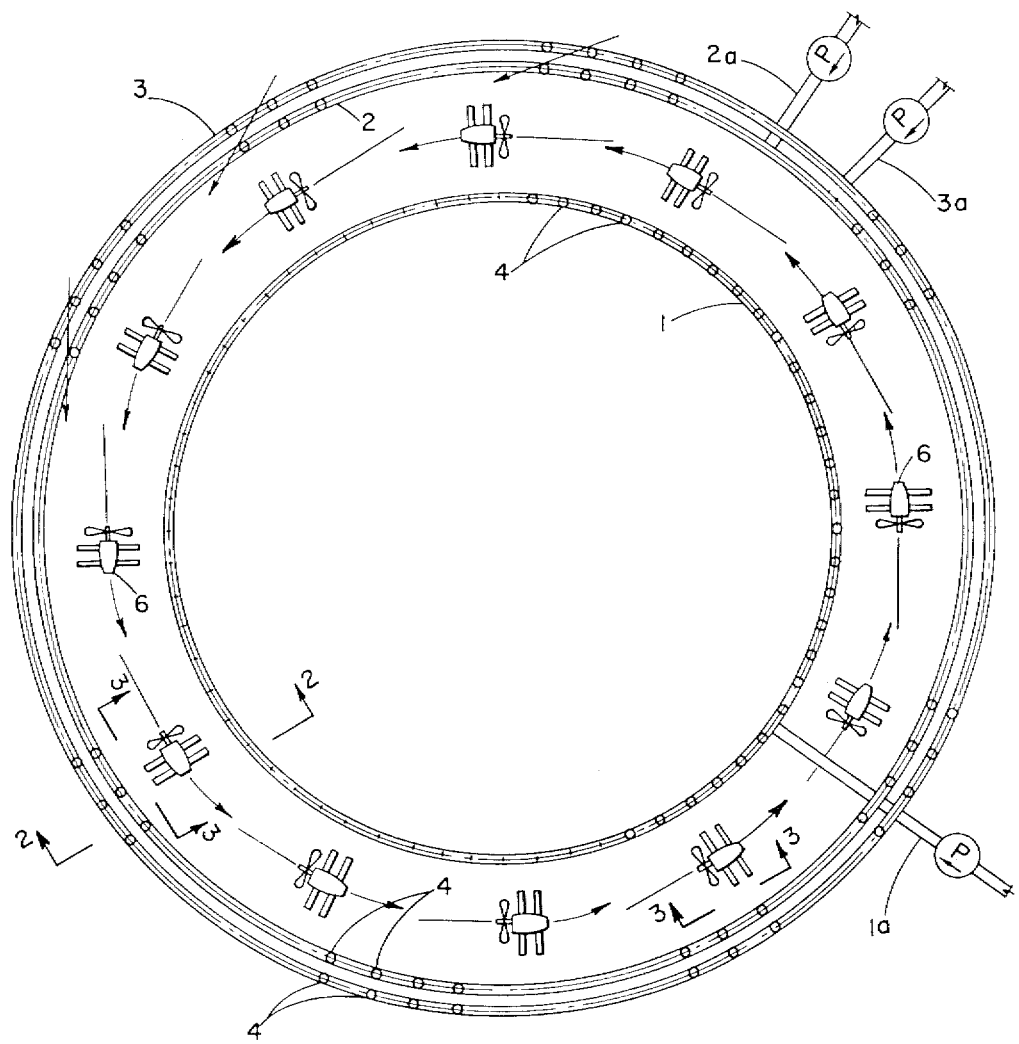
Figure 1 is the general plan of the generating equipment; showing engines for blowing air generally in curvilinear direction as indicated, by arrows.

Numeral 1 is the inner conduit or pipe for circulating sea water. This pipe is bent in a circular form and is supplied by a feeder or feeders marked 1a, Fig. 1, and pump or pumps marked P. The water is pumped directly from the ocean.

Numerals 2 and 3 represent the outer conduits or pipes, also for circulating sea water. They are fed by feeders 2a and 3a respectively and pumps P as indicated for pipe 1.

All the circulating pipes are preferably embedded in a curved concrete slab 7.

Numerals 4 represent vertical nozzles for spraying the circulating sea water high in the air. These streams or sprays issuing from the nozzles are indicated by numeral 5. By such spraying a small amount of water is vaporized and fine particles of the contained salt are wafted aloft to later serve as nuclei for collecting condensed moisture. Numeral 6 indicates an aeroplane engine or engines with a propeller 6a. The engines are supported by structural frames 6b.

The units involved may be of large power, each developing about 1000 horsepower. They are placed on a curved center line between circulating pipes and are equally spaced along the circle. The engines are so placed that the air blast generated follows approximately a circular path in plan passing through the engines. The blast may also be given a vertical component, or a helical motion by inclining the engines about 6° with the horizontal.

Reference numeral 7 designates a general concrete operating slab, circular in plan, and sloped or dished towards drains (not shown), for discharging sprayed water back into the ocean, or more directly to the circulating pumps if so desired.

Figure 2:
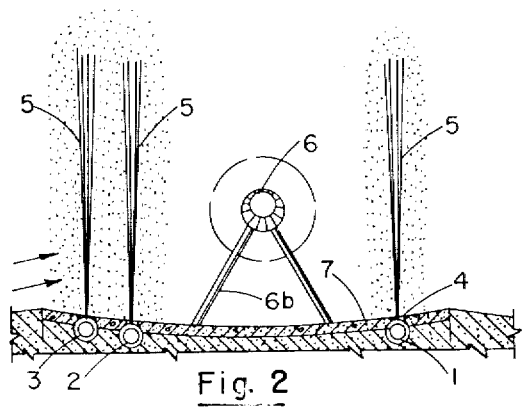
Figure 2 is a cross section taken along lines 2—2 in Figure 1, showing an engine and a channel for air blast, formed by bounding sprays or walls of falling circulating water.
Figure 3:
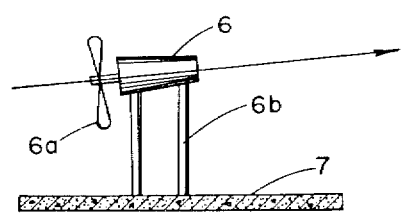
Figure 3 is a section taken along lines 3—3 in Figure 1 showing a blowing engine.

It is obvious from the drawings, Fig. 1 to 3, that the air between two adjacent propellers is acted on by two forces, one pushing and one pulling and making a small angle with each other. When a great number of such propellers are mounted tangentially along a circle, their combined action will blow the air approximately along a circle. But then in addition there are other inducements for making the air move along a circle; one such inducement being the resistance offered to fast air flow at the outer boundary of the air channel by the jets and the falling drops of water. Since these offer considerable resistance to flow, the air is deflected and tends to move in a circular path. Finally, there is still one more force, and that is the movement of light moist outside air which is moving towards the vortex. This is indicated on the drawing in Fig. 1 by arrows 11 at the outer nozzles. Where we have a mass of light humid air at the surface and cold air aloft, it tends to rise with a spiral ascent induced by the rotation of the earth. When atmospheric conditions are not suitable (the lapse rate or the drop of temperature with altitude being too small) the system is not intended to be operated. The air will never move outwardly from the center and there will not be a down flow of air into the center of the circle under the operating conditions indicated. As pointed out above, a large number of blowers in action will cause the diffusing effect outwards to be negligible; but even this may be corrected if so desired by a slight rotation of the blowers in from the tangent. This is obvious and there is nothing rigid about the system.

The plant proposed would have to be fairly pretentious consisting of about 50 to 60 aeroplane engines each about 1000 H. P., the engines being equally spaced along a circle about ½ mile in diameter. The nozzles 4 should be spaced about 10 feet on center and should be able to throw a stream of water 5 in the air about 100 feet. The blast channel between the inner and the double outer row of nozzles should also be about 100 feet wide. To increase the power, the system could be magnified by using a concentric series of such rings.

In the general operation of this method and apparatus for making and promoting rain from highly saturated atmosphere, it is intended that this operation be carried out when conditions are particularly favorable, for unless this be done the results produced would be meager. Although the installation proposed is quite pretentious amounting to 60,000 horsepower or more, it is still very small when consideration is given to the large volume of air that has to be moved. This apparatus can be very useful when operated closely with nature, and only by inducing and promoting her processes, and under favorable conditions can substantial rain be obtained. This can be done in three ways. The first and by far the most preferred method is under conditions when the surface atmosphere is quiet, when the air over the ocean is stagnant, hot and humid, with heavy clouds in the sky and a mass of cold air aloft in the immediate vicinity. The natural season for this operation would be summertime; and the timing should be chosen not only to the day but even to the hour, whenever such conditions present themselves then the apparatus can be turned on, starting with the cold water circulating pumps and the vertical streams of sprayed water. When these are operating, the engines and the propellers supplying the blast can be turned over. This work should preferably be done automatically from a central control station. The blast and the spray will supply some cooling, but in addition, the air in the vortex will be saturated almost 100% under favorable conditions. The cooling resulting from direct conduction supplied by the spray should make the air somewhat denser than still air over the open sea, but the effect produced by saturation, the release of latent heat due to partial condensation, and dynamic expansion due to vertical and curvilinear motion should make it lighter. The net effect as far as weight is concerned is fairly small. It is, however, slightly lighter. (It can be made appreciably lighter by including higher velocities.) This air moreover, has these other characteristics; its is saturated; it has curvilinear motion and vertical motion. Because of these characteristics, the rotating mass of saturated air climbs or rises rapidly upwards. The energy of the vortex is augmented by the latent heat of condensation of the water vapor, from the surrounding air mass and the continuous drive by the engines below. The vortex climbs higher until the clouds are reached. If the air aloft is very cool a marked difference of thermal potential is established, the miniature cyclone cools rapidly, condensation sets in causing additional pressure drop and attendant rain. The pressure drop exerts a strong pull on other saturated air in the immediate vicinity, promoting a more extensive storm center. Under the influence of the winds aloft and any rising prevailing surface winds the storm so generated will drift towards the shore, generally in the direction of the resultant of the wind force effects on a rotating cylinder of air as outlined in the preceding description.

The general idea behind this method is that it is easier to promote precipitation over the open sea where the air is more highly saturated with moisture and then direct this precipitation towards the shore than it would be to start rainfall over the mainland where the air tends to become superheated.

The second method for promoting more rain with the apparatus outlined is where there are incipient showers over the open sea, but there are gentle winds blowing these rains parallel or slightly away from the coast. By starting the generating plant a vortex is induced to form which will promote greater rainfall and also guide some of the rainfall towards the shore. This would be in accordance with the laws of travel of cyclonic storms.

There is still a third method for inducing rain with this same apparatus, and that is, when the air is humid and heavy clouds are lazily floating overhead, but no rain is falling, if the apparatus is turned on and timed so that the vortex will reach the cloud when it is overhead, rain can be generally induced to fall. The vortex which is saturated with considerable condensation as it reaches the cloud level will induce high curvilinear velocity and superelevation in the cloud itself. This in turn will produce dynamic expansion with consequent cooling. If the cloud is so heavily saturated that it approaches a state of precipitation this new curvilinear turbulence and superelevation will set it off resulting in additional pressure drop due to additional condensation which will produce a widened cyclonic disturbance with more rain. This last method of inducing rain from clouds lends itself to mainland operation.

Summary

This plant is set up primarily to saturate a column or cylinder like volume of surface air and give this air a helical motion, this motion being induced by engine driven propellers or blowers driving the air in a circular channel made by walls of sprayed water. As this air is set in motion it is cooled slightly by direct conduction with the spray. It is cooled further by partial evaporation of the water of the spray. The energy necessary to produce this evaporation is supplied partly by the outside air, partly by insulation, and partly by hot exhaust of the engines. The air is still further cooled by dynamic expansion due to the blast. Nearly all of this cooling however is nullified by the latent heat of partial condensation. So the net effect is negligible as far as cooling is concerned, possibly 1° F. cooling under normal operation. As a matter of fact in cyclonic storms there is a rise in temperature due to the large amount of heat released as latent heat of condensation. The net effect is that the cylinder of air is practically saturated with water vapor. The air is also partially rarified due to motion, so that it is slightly lighter than the surrounding surface air. In addition, this cylindrical volume of air has a high curvilinear velocity and a vertical velocity.

This cylindrical mass after being put in motion, rises rapidly. The forces acting are the engines below and buoyancy. As the air rises it is cooled first by direct expansion (having less weight of air pressing down on it) also due to dynamic expansion due to motion. However some condensation takes place and latent heat is given up so that the rate of cooling due to expansion is not at adiabatic rate, as for pure dry air, or slightly humid air where no condensation is taking place, which is approximately 5.5° F. per 1000 feet of rise, but at a wet adiabatic rate about 3° F. per 1000 feet. This is somewhat at a smaller rate than the air outside. Nevertheless due to motion both curvilinear and vertical, and higher humidity the air is consistently lighter than the outside surrounding air. When this mass of highly saturated air reaches cold masses of air aloft, or if cold planetary winds sweeping from the Southern hemisphere are reached, condensation becomes rapid, partial pressure due to water vapor is sharply reduced resulting in a sudden pressure drop, additional suction is established, the system is unbalanced and additional surface humid air is drawn up which joins in the whirl and is condensed in the form of rain. If the timing is good this incipient cyclonic disturbance will drift shorewards under the influence of the winds aloft and the rising prevailing winds below. Approximately in the direction of the resultant vector of the wind force effects on a rotating cylinder of air; both at the surface, and aloft, are somewhat analogous to a ship under sail and controlled with a rudder.

It should be clear from the above description of the present invention and the discussion of the natural precipitation phenomena, that, given sufficiently favorable conditions, the natural processes of precipitation may be induced by initiation of the vorticular action which otherwise would not normally be initiated in the desirable location to satisfy urgent needs not only of the resulting precipitation in arid areas, but of its inherent cleansing effects on accumulated quiescent masses of commercially or naturally polluted or contaminated air in populated areas. It must be recognized that smog areas e. g. such as habitually occur in Los Angeles and vicinity would find it extremely advantageous to be able to induce a cleansing rain at least whenever favorable conditions were found in proper proximity. The seriousness of the problem, in many instances, will undoubtedly justify even large expenditures for suitable artificial equipment required to initiate the precipitation by giving a boost to the natural phenomena, which at times require very little help to get them under way. It is understood that proper precautions could be observed in not using this process under conditions that might lead to a destructive storm, as e. g. conditions involving a vertical temperature gradient in substantially undisturbed air of the order of 7° F. per 1000 feet.

So having described this theory, method and apparatus for precipitating artificial rain, it is felt others skilled in the art can construct and operate the generating plant outlined, and make obvious minor changes in the form

I claim:

1. A process of inducing rain under suitable conditions including a humid mass of warm air at the ground and a cold mass of air above it, having a temperature gradient of at least 5° F. per 1000 feet altitude or a retarded adiabatic gradient of at least 3° F. per 1000 feet, comprising artificially initiating an annular vortex of air in said humid mass, and providing annular spray curtains of sea water peripherally on the inside and outside of said annular vortex, whereby to initiate a cyclonic effect which will gather momentum as the combined result of the rising centrally located warm air because of the Bernoulli effect of the induced velocity in said annular vortex making the vortex air lighter under the reduced pressure, and the higher pressure remaining around the outside near the bottom of the vortex after the pressure inside the annular vortex has been reduced by drawing off some of the inside air into the rising annular vortex, the vortex being induced to rise because of the induced displacement at the bottom by the surrounding air, the Magnus effect causing the thus initiated reduced pressure vortex to attain a translatory movement across-country in a direction in accordance with any prevailing wind, its translatory velocity and intensity of momentum being determined by the attendant continuing changes in the favorable conditions.

2. The process defined in claim 1 wherein the initiated annular vortex has a small upward component.

3. The process defined in claim 1, and selecting a situs for the said initiation of said vortex spaced a suitable distance from the area requiring the precipitation in a direction with respect to the prevailing winds in the vicinity of said area opposite to the expected translatory movement of the cyclonic effect resulting from its reaction with said prevailing winds.

4. An apparatus for inducing precipitation from humid atmosphere, comprising a tandem series of blowers arranged in a circle at the ground level, spray distribution nozzles arranged in circular rows along the inside and outside of said series of blowers to provide concentric cylindrical spray curtains defining an annular channel for a vortex of air produced by operation of said blowers, and means for supplying salt water to said nozzles under pressure for spraying therethrough.

5. An apparatus as defined in claim 4, wherein said blowers are tilted slightly upward.

References Cited in the file of this patent

UNITED STATES PATENTS

| | | |
|---|---|---|
| 990,121 | Drake | Apr. 18, 1911 |
| 1,252,670 | Dessoliers | Jan. 8, 1918 |

OTHER REFERENCES

Rain Making and Other Weather Vagaries, by Humphreys, published 1926 by Williams and Wilkins Company; pages 41 to 46 relied on.